(12) United States Patent
Chopra et al.

(10) Patent No.: US 10,083,095 B1
(45) Date of Patent: Sep. 25, 2018

(54) ANALYTICS-BASED BACKUP SYSTEM FOR DETERMINING OPTIMUM BACKUP METHODS AND PREDICTING BACKUP WINDOWS

(71) Applicant: EMC IP Holding Company LLC, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 448 days.

(21) Appl. No.: 14/497,224

(22) Filed: Sep. 25, 2014

(51) Int. Cl.
*G06F 17/30* (2006.01)
*G06F 11/14* (2006.01)

(52) U.S. Cl.
CPC .... *G06F 11/1464* (2013.01); *G06F 17/30082* (2013.01); *G06F 17/30144* (2013.01)

(58) Field of Classification Search
CPC ........... G06F 17/30082; G06F 11/1464; G06F 17/30144; G06F 2201/86; G06F 11/3447; G06F 11/3476; G06F 11/1453
See application file for complete search history.

(56) References Cited

U.S. PATENT DOCUMENTS

| | | | | |
|---|---|---|---|---|
| 7,546,323 B1* | 6/2009 | Timmins | ............. | G06F 11/1464 |
| 8,914,329 B1* | 12/2014 | Chandra | ............... | G06F 11/263 |
| | | | | 707/654 |
| 8,918,372 B1* | 12/2014 | Guo | .................. | G06F 17/30156 |
| | | | | 707/692 |
| 2006/0010107 A1* | 1/2006 | Nguyen | ............. | G06F 11/1458 |
| 2008/0235433 A1* | 9/2008 | Chen | .................... | G06F 12/0246 |
| | | | | 711/100 |
| 2009/0254593 A1* | 10/2009 | Halim | ................. | G06F 11/1461 |
| 2009/0300633 A1* | 12/2009 | Altrichter | ............ | G06F 9/4856 |
| | | | | 718/103 |
| 2010/0082555 A1* | 4/2010 | Ogawa | ............. | G06F 17/30144 |
| | | | | 707/688 |
| 2011/0082837 A1* | 4/2011 | Cherkasova | ........ | G06F 11/1461 |
| | | | | 707/654 |
| 2013/0262385 A1* | 10/2013 | Kumarasamy | .... | G06F 17/30581 |
| | | | | 707/634 |
| 2013/0290248 A1* | 10/2013 | Fukatani | ........... | G06F 17/30212 |
| | | | | 707/610 |
| 2014/0297586 A1* | 10/2014 | Kim | ...................... | G06F 17/302 |
| | | | | 707/610 |

* cited by examiner

*Primary Examiner* — Scott A Waldron
*Assistant Examiner* — Fatima P Mina
(74) *Attorney, Agent, or Firm* — Staniford Tomita LLP

(57) ABSTRACT

Embodiments are described for analytic backup of datasets in a client-server network. A system or processor-based operation derives historical data about backup operations performed in a client-server computer network system and analyzes a present backup operation to be performed for a client computer dataset with respect to a plurality of parameters comprising data type, backup level/data density, backup method, and target storage type. A report comparing one or more past backup operations from the historical data to the present backup operation is generated and transmitted to a user of the client to facilitate selection of an optimum backup method for the present backup operation with respect to minimized backup operation time.

19 Claims, 6 Drawing Sheets

300

| S.No. | Client name | Data Source | Data type | Data Size | Data Density Number of files/ dataset size | Target Device Type | Backup time | Through put | Backup Technology |
|---|---|---|---|---|---|---|---|---|---|
| 1 | A | FS | HDFS | 200 | 0.25 million/GB | DD OSR | 1 hour | | Block Based |
| 2 | A | FS | SDFS | 1 TB | 10 files/GB | DD | 5 hour | | Legacy |
| 3 | A | 100 VM | GUEST OS | 1 TB | 1 VM/100 GB | DD FC | 1 hour | | VMWARE Advanced Data Protection |
| 4 | A | 100 VM | GUEST OS | 1 TB | 1 VM/100 GB | DD FC | 18 hour | | VADP Legacy |
| 5 | A | Exchange | MDFS | 10 TB | 20 FILES/GB | DD VTL | 4 hour | | VSS |

| S.No | Client name | Data Source | Data type | Data Size | Data Density Number of files/ dataset size | Target Device Type | Backup time | Through put | Backup Technology |
|---|---|---|---|---|---|---|---|---|---|
| 1 | A | FS | HDFS | 200 | 0.25 million/GB | DD OSR | 1 hour | | Block Based |
| 2 | A | FS | SDFS | 1 TB | 10 files/GB | DD | 5 hour | | Legacy |
| 3 | A | 100 VM | GUEST OS | 1 TB | 1 VM/100 GB | DD FC | 1 hour | | VMWARE Advanced Data Protection |
| 4 | A | 100 VM | GUEST OS | 1 TB | 1 VM/100 GB | DD FC | 18 hour | | VADP Legacy |
| 5 | A | Exchange | MDFS | 10 TB | 20 FILES/GB | DD VTL | 4 hour | | VSS |

| S.No | Client name | Data Source | Data type | Data Size | Data Density (Calculated) Number of files/Size of the data | Target Device Type | Backup time | Throughput (calculated) | Backup Technology |
|---|---|---|---|---|---|---|---|---|---|
| 1 | A | FS | HDFS | 200 GB | 0.25 million/GB | DD FC | 1 hour | 100 M | Block Based Backup |
| 2 | B | FS | HDFS | 200 | 0.25 million/GB | AFTD | 2 hour | 50 M | Block Based Backup |
| 3 | C | FS | HDFS | 200 | 0.25 million/GB | DDVTL | 3 hour | 25 M | Block Based Backup |

500

| Client Name | Data | Backup time | Backup Level | Backup Method | Data Type | Backup target |
|---|---|---|---|---|---|---|
| Hostname1 | F:\ | XXX:YYY | Full | BBB | HDFS | DataDomain |
| Hostname2 | MSSQL: | AAA:BBB | 1 | VSS | SQL | DataDomain |
| Hostname3 | RMAN: | CCC:DDD | 1 | SBT | Oracle | DataDomain |
| Hostname4 | BACKINT: | EEE:FFF | 1 | BACKINT | SAP | Tape |
| Hostname5 | SYBASE: | GGG:HHH | INCR | PLUGIN | SYBASE | VTL |
| Hostname6 | G:\ | II:JJ | INCR | LEGACY | SDFS | DISK |

| Option 1 | DD OST | 100 % faster than 2 best option |
|---|---|---|
| Option 2 | AFTD | 50 % faster than 3rd Option |
| Option 3 | DD VTL | 25 % faster than 4th Option |
| Option 4 | TAPE | Least Optimum |

FIG. 6

ANALYTICS-BASED BACKUP SYSTEM FOR DETERMINING OPTIMUM BACKUP METHODS AND PREDICTING BACKUP WINDOWS

TECHNICAL FIELD

Embodiments are generally directed to computer backup systems, and more specifically to determining optimum backup methods for networked backup systems.

BACKGROUND

Various backup and recovery software products have been developed to centralize, automate, and accelerate data backup and recovery across different information technology (IT) and enterprise environments. The goal of such products is to efficiently back up and recover data in the event of user error, data loss, system outages, hardware failure, or other catastrophic events to allow business applications to remain in service or quickly come back up to service after an outage.

Various types of backup methods and technologies are available in large-scale computer network systems with regard to the speed and amount of data that is stored up per backup session. The three main types of backups are full, incremental, and differential backups. Full or traditional (normal) backup methods back up all files on a drive or partition every time a backup is performed, while an incremental backup backs up only those files that are changed or added since the last incremental backup, and a differential backup backs up files that have changed since the last full backup. These different strategies impose different time requirements, processor overhead, and resource costs, and they also provide different amounts of security and ease of restoration. For example, a full backup takes the longest time to perform but generally features the fastest restore time since all the data is readily available on the target storage (e.g., tape or disk). In contrast, incremental and differential backups may feature much faster backup times but longer restore times and increased processor overhead since changed files must be correctly indexed (tagged) and identified during the backup and restore operations.

The type and amount of target storage also impacts the choice of backup type since the speed and volatility of such memory may also affect backup strategies. Target storage devices typically comprise arrays of tape devices, optical disk devices, or magnetic disk devices, such as RAID (redundant array of inexpensive disks) arrays, and virtual storage devices. These memory devices typically feature significantly different access times, densities (e.g., high, medium, low), and other practical features, such as cost and power consumption and heat generation. Thus, while it is generally true that performing full backups are not practical for every situation, since many large organizations have too much data to efficiently backup on a periodic basis, it is sometimes true that incremental or differential backups are not necessarily optimum given the amount of changed data, type of data, target storage devices, restore time and data protection requirements, and other practical factors.

In the field of data backup and information protection, predictability of backup windows (i.e., duration of time to perform a data backup) is an important aspect yet it is very hard to find a solution that can provide such predictability with a sufficient degree of accuracy for many time critical applications. System administrators and backup technicians often admit that one of the biggest challenges they face is how to predict the backup window and the preferred backup and storage technology for a given data protection task. Most of the time, the optimum solution is simply derived by extrapolation or guess work, and is highly dependent on the actual application and/or system configuration. This makes present backup techniques and systems ill-suited to provide real-time data acquisition and IT systems where predictable or deterministic backup operations are required or highly beneficial. This is also big disadvantage for organizations that do not have experienced system administrators or personnel who are experienced in backup operations and have a wealth of information regarding the efficacy and impact of different backup methods that might be available.

What is needed, therefore, is a backup system that automates the process of determining an optimum backup method for a particular backup and restore scenario, and that facilitates the automation of the backup process itself.

What is further needed is a backup method that provides real time responsiveness and that is based on analytic data built from actual backup environments to provide accurate predictability of backup windows for various different data sources.

What is yet further needed is a backup system that that achieves strict recover time objectives during disaster or failure incidences and that reduces or makes more efficient usage of available storage resources.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 3A illustrates a table that presents historic backup data for a particular client and that may be used by an analytic backup system, under some embodiments.

FIG. 3B illustrates a table that presents example backup information for multiple clients that may be generated by the analytic backup system, under some embodiments.

FIG. 5 illustrates a table that lists some example values and schema for metadata used by the analytic backup server, under some embodiments.

FIG. 6 illustrates a table that represents an example report generated by the analytic backup server, under some embodiments.

DETAILED DESCRIPTION

Figure 1:
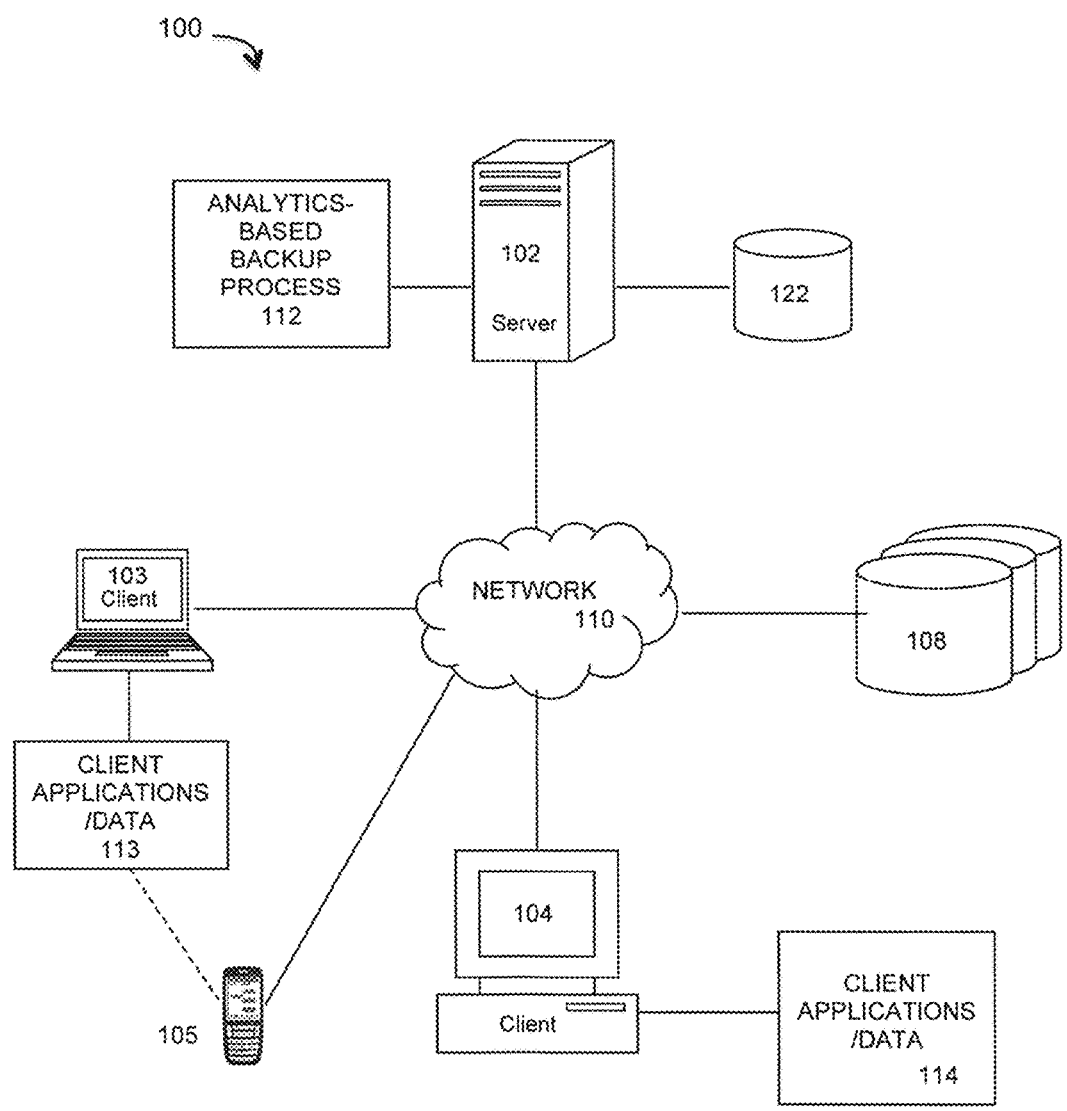
FIG. 1 is a diagram of a networked computer system that implements an automated method of determining an optimum backup method for client computers, under some embodiments.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be appreciated that the embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hard-wired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of performing data backups using analytic processes and components that help determine an optimum backup method and predictable backup windows for different datasets and data sources. Some embodiments of the invention involve automated determination of optimum methods for backup and recovery software in a distributed system, such as a client-server network, local area network (LAN), wide area network (WAN) or larger scale computer network system; however, those skilled in the art will appreciate that the invention is not limited thereto. Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments. In system 100, a network server computer 102 is coupled directly or indirectly, to one or more network client computers 103, 104, and 105 through a network 110. The network interface between server computer 102 and the client computers may include one or more routers that serve to buffer and route the data transmitted between the server and client computers. Network 110 may be the Internet, a Wide Area Network (WAN), a Local Area Network (LAN), or any combination thereof. Network 110 thus provides connectivity to the various systems of FIG. 1 and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform.

A client computer in system 100 may be a workstation computer 104 or it may be a computing device such as a notebook computer 103, personal digital assistant, thin network client device, or the like. The client computer may also be embodied within a mobile communication device 105 that provides a sufficient degree of user input and processing capability to generate and access data to be processed by the network, or that remotely accesses applications and data hosted by another client, e.g., client 103 and data 113. The client computers may be coupled to the server computer 102 over a wired connection, a wireless connection or any combination thereof that make up at least a portion of network 110. Each client 103 and 104 may run its own respective applications 113 and 114 to generate and process data through various client processes. In an embodiment, one or more clients may be virtual clients, such as in a multi-tenant network in which a server computer (e.g., server 102) runs a single instance of a program serving multiple clients (tenants) in which the program is designed to virtually partition its data so that each client works with its own customized virtual application.

In one embodiment, server 102 in network system 100 is a server computer that executes a server-side backup process 112, and such a server may be referred to as a "backup server." The backup process 112 may represent one or more executable programs modules that are stored within network server 102 and executed locally within the server. Alternatively, however, it may be stored on a remote storage or processing device coupled to server 102 or network 110 and accessed by the server to be locally executed. In a further alternative embodiment, the process 112 may be implemented in a plurality of different program modules, each of which may be executed by two or more distributed server computers coupled to each other, or to network 110 separately.

FIG. 1 illustrates an environment where automated backup methods and systems may be implemented, in accordance with some embodiments. The client applications 113 and 114 are used to generate and send requests to applications executing in servers, e.g., server 102. One or more of the network servers may represent a web and/or application servers that execute applications capable of performing tasks requested by the client users. The applications may perform tasks on data maintained internally or externally and send the result to the clients. It should be noted that different modules of the same application may be deployed and executed on different systems within system 100. As illustrated by FIG. 1, there may be any number of clients and any number of servers.

The data generated within system 100 may be stored in any number of persistent storage locations and devices, such as local client storage, server storage 122, or network storage 108. In an embodiment network 100 may be implemented to provide support for various storage architectures such as storage area network (SAN), Network-attached Storage (NAS), or Direct-attached Storage (DAS) that make use of large-scale network accessible storage devices 108, such as large capacity tape or drive (optical or magnetic) arrays. In an embodiment, the target storage devices, such as tape or disk array 108 may represent any practical storage device or set of devices, such as tape libraries, virtual tape libraries (VTL), fiber-channel (FC) storage area network devices, and OST (OpenStorage) devices.

As shown in FIG. 1, server 102 represents a backup server that executes an analytics-based backup (or analytic backup) process 112 that analyzes backup operations for one or more of the client computers to determine an optimum backup method or strategy for a particular backup scenario involving specific types of datasets, target storage devices, data sources, and so on. The backup process 112 is configured to compare two or more different backup methods and provide a recommendation or ranked order of possible backup methods to the user, and it may also be configured to automatically initiate the backup process from the client computer based on the optimum strategy. In general, the backup methods that may be employed comprise full backups or block-based incremental or differential backups. The backup methods may be further defined with respect to specific data and/or network environments. For example, block level backups may be snapshot backups, such as the volume shadow copy service (VSS), which is a Microsoft Windows service for capturing and creating data snapshots (shadow copies) and which operates at the block level of the file system. Other specialized incremental backup methods include methods for protecting virtual machines, such as vStorage APIs for Data Protection (VADP), e Consolidated Backup (VCB), VMware Advanced Data Protection, and other similar backup methods. It should be noted that any defined backup method and target storage device 108 may be defined and analyzed within system 100.

Figure 2:
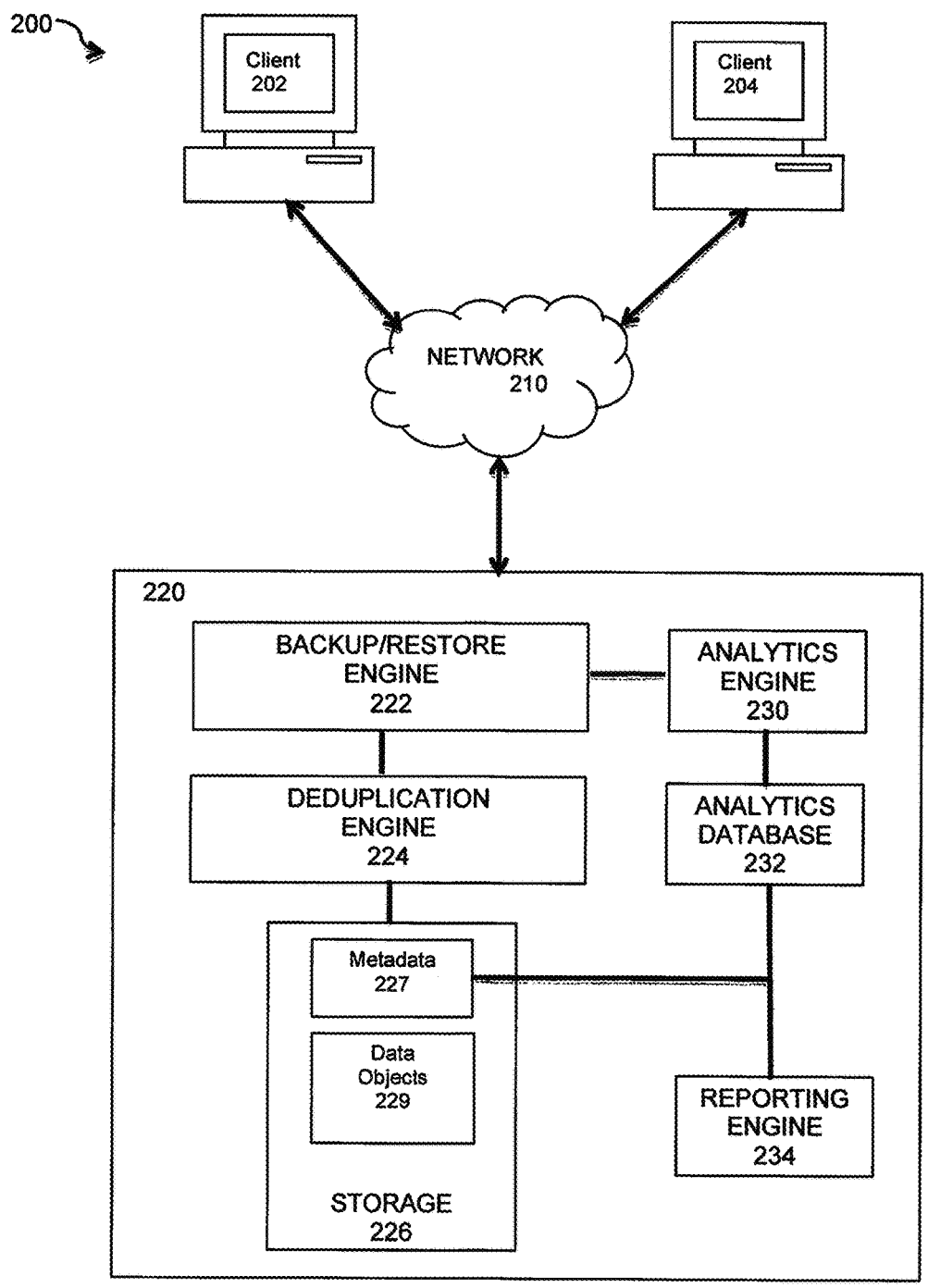
FIG. 2 is a diagram of a backup server system for determining an optimum backup method, under some embodiments.

FIG. 2 illustrates a system 200 that implements an intelligent backup process using analytics and realtime data, under an embodiment. Such a system helps users to achieve recover time objectives during disaster scenarios and reduce the total cost of ownership (TCO) by reducing the amount of storage required for backup operations. The system also adds a high degree of predictability to backup estimates and provides powerful reporting and trending information regarding system backups. As shown in FIG. 2, one or more client computers 202 and 204 are coupled to a backup server 220 (analytic backup server) over network 210. The backup server 220 includes a backup/restore engine (or component) that performs backup and restore operations for each of the clients 202 and 204. In general, data (e.g., files, folders, objects) from each client is stored in respective data storage device 226 or set of data storage devices that are included within or coupled to the backup server 220. For the embodiment shown, only one data storage device 226 is shown, but it should be understood that any number of storage devices corresponding to the number of clients may be provided in the system. A backup operation takes data from the clients and stores it in the respective storage device 226, and a restore operation takes client data from the storage device 226 and transmits it back to the respective client for loading back on the client. The amount of data transmitted between the client during these operations depends on the type of backup operation is performed. In an embodiment, backup/restore engine 222 is configured to perform full, incremental, and differential type backup operations of specific types depending on the network environment. A deduplication engine 224 may be provided to perform certain efficiency-oriented functions such as deduplication. Other processes may also be provided in the backup server 220, such as protocol processes, access control processes such as in the case of different clients or virtual clients in a multi-tenant environment.

The storage unit 226 shown in FIG. 2 may be an external storage resource, such as an array of disk and disk drives, tape drives, memory arrays, or other data storage devices that are remotely coupled to server 220 over the network, or they may be directly coupled to or contained within the server 220 system.

As shown in FIG. 2, backup server 220 includes an analytics engine that keeps track of previous backup data operations by each client and also defines the dataset by density, such as high density file system (HDFS) on the order of millions of files, medium density file system (MDFS) on the order of tens of thousands of files, and small density file system (SDFS) on the order of hundreds or thousands of files. The backup/restore engine 222 stores or retrieves data objects 229 and associated metadata 227 in the appropriate storage device or location 226. The metadata 227 represents information that pertains to the data being backed up, the backup method, and any other relevant information pertaining to the backup operation. In general, the metadata is any information that is an attribute of the data source and that defines the data, such as file type, data configuration (e.g., clustered/non-clustered), and so on. Backup operations are defined by metadata definitions, and the analytic engine executes an analytics algorithm that helps keep track of different metadata information (even when the backup catalog is purged). The analytics engine 230 also has an analytics database 232 that stores the metadata information 227 persistently, such as in storage 226. A reporting engine 234 fetches data from the analytics database 232 and generates a report or backup trend information to the user.

In an embodiment, backup information is captured as part of the backup operation itself and is cataloged in a table, or other similar format, by the analytics engine 230. The analytics engine derives backup trend data for one or more clients by tracking and storing backup history data to enable an analysis of a present backup operation so that an optimum backup method can be recommended to the client user. Thus, the analytic backup server determines what method of backup is best suited for a particular dataset by using historical backup information based on parameters such as data sources, storage device types, data densities, and so on, so that a prediction of backup windows can be provided to allow the client user to make an informed decision as to possible backup methods to employ for a given backup operation and dataset.

FIG. 3A illustrates a table that presents example historic backup data for a particular client and that may be used by an analytic backup system, under some embodiments. Table 300 lists some of the information that is pertinent in generate a prediction of a backup window for a dataset to be backed up on a client computer based on historical or test backup data and based on dataset and target device characteristics. The data in table 300 comprises past or historic backup sessions (S), and specifically five (5) such sessions for a particular client (denoted client A). As can be seen each backup session involved a specific data source, such as a file system (FM), virtual machine (VM) or exchange data, and that may have been generated by a particular data application, such as an Oracle database, Informix database, e-mail program, for example. The information shown in FIG. 3A is intended to be for purposes of example only and is specific to a particular distributed network environment and data types, such as an EMC Data Domain (DD) deduplication storage system environment that may also utilize virtualization technology, such as provided by VMware or similar systems.

With regard to FIG. 3A, each row of table 300 represents a profile of a particular data source, and the overall table represents a client or user profile for the set of historic backup data. A client can usually backup data using one of several different methods, for example, exchange data can backed up using VSS, VADP, or other methods. Though other data sources may be limited, it is generally true that each data source may have more than one way to be backed up. The example backup methods (backup technology) shown in FIG. 3A include VMware advanced data protection, advanced VADP, snap and replicate (VSS), and legacy technology, among others.

The historic information provided in the table provides trend data that can be used to determine an optimum backup method for future backups. For example, as can be seen in table 300, the block based method is best (fastest) for HDFS (high density files), which makes sense since multiple millions of files may need to be backed up, and the other methods will likely take longer. Certain client specific information, such as system configuration and data characteristics (source, type, size, etc.) are used by the backup server to derive the historic backup data and generate reports for recommended backup methods. In an embodiment, the client user may provide configuration information to the system, or the system may configured to automatically derive the user configuration with respect to file type, target device type, file system structure, and so on. The backup server uses the historic data to then provide a recommendation based on the requirements of a present data backup operation, and the server provides one recommendation per data source, though different historic backup methods may be analyzed for each data source.

FIG. 3A illustrated historic data for a specific client, but in a distributed network system, data may be available for several clients that are managed by a single server 220. FIG. 3B illustrates a table that presents example backup information for multiple clients that may be generated by the analytic backup system, under some embodiments. Table 310 contains a number of columns that define different characteristics of the backup sessions (S) for multiple clients (denoted A, B, and C) such as, data source, data size/type/density, target device type, backup time, calculated throughput, and backup technology. The data source may be a file server or other similar source including a virtual machine, exchange device, and so on. The data type column lists the density of the file system: high, medium, or low (HDFS, MDFS, LDFS). The size of the data (in GB) to be backed up in each session is then used to calculate the data density in terms of number of files divided by the size of the data. The target device type column lists the storage devices to be used for each session, such as a VTL, advanced file type device (AFTD), standard tape memory, and any other type of target storage device. The backup time for each session is then logged in a backup time column of table 310, and the throughput is calculated based on the data density and backup time information. The backup technology column lists the backup method used for each session, such as full backup or block-based backup (incremental or differential), or any specific type of network backup technology (e.g., VADP, VSS, legacy, and so on.)

The information of table 310 is populated and updated each time a backup session is completed. FIG. 3B provides one example of a table that may be generated by the backup server with example values shown for purposes of illustration. It should be noted that many other formats and values may be provided based on specific applications and environments. In an embodiment, the table is generated for presentation to the user through a GUI (graphical user interface). Through appropriate GUI tools, the user may be given an option to select the different values regarding the backups that he or she wants to capture, such as additional details. The user can alter the columns and change certain parameter, such as the measurement (e.g., for data size instead of GB, track TB), or track the level of backups, and so on. This list of tabulated items is thus user configurable at any time, and at the end of each backup session, the analytics engine 230 catalogs the table in the analytics database 232.

Once the backup operation is done for all the save sets, the system can be configured to update the metadata that has the information such as shown in table 310 of FIG. 3B. Alternatively, the system may be configured such that the backup is performed without capturing the information. The analytics engine 230 the parses the logs/event viewers and other logs and generates the metadata information for storage in the analytics database 232. These two alternative metadata capture methods may be set by the user, such as through an "Index Advanced Tracking" option or command that is selected by the user during the backup operation, and that may be provided as a GUI element (e.g., checkbox) for selection by the user. Thus, if the Index Advanced Tracking option is enabled, the system will capture the metadata information as the backup sessions are performed (online or in-band mode), otherwise the metadata information will be derived at a later time (offline or out-of-band mode). The index advanced tracking operation allows the user to dictate when backup metrics are taken from the system and defer the additional processing until times when the network is not negatively impacted by this processing.

Figure 4:
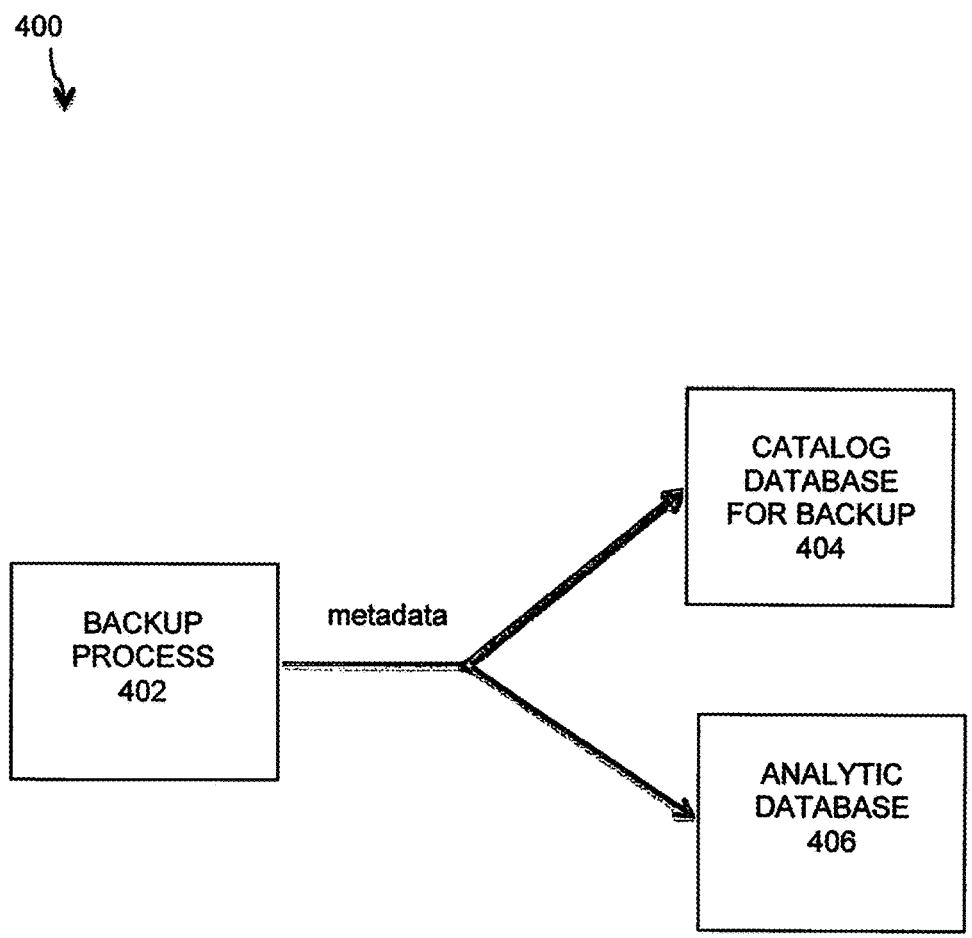
FIG. 4 illustrates the generation and storage of metadata by an analytic backup server, under some embodiments.

FIG. 4 illustrates the generation and storage of metadata by the backup server, under an embodiment. As stated previously, metadata generally comprises anything that is an attribute of the data source or anything that defines the data. As shown in diagram 400 of FIG. 4, backup process 402 generates metadata for each backup session. Metadata information is stored in a catalog database for the backup operation 404, as well as in the analytics database 406. The analytics engine leverages the catalog database to perform certain analysis operations on the backup metadata, such as to compare time, throughput and other characteristics of different backup sessions. The metadata can be stored in the catalog and analytics databases in many different formats. FIG. 5 illustrates a table 500 that lists some example values and schema for metadata used by the backup server, under an embodiment. As shown in table 500, various different columns are provided that capture various items of information associated with different backup sessions, such as the client name, the data source (e.g., source folder or directory as a pathname), backup time/level/method, data type, and backup target. It should be noted that FIG. 5 is an example of a metadata format with example values, and that many other formats and values are possible.

As stated above, the metadata that is captured for each backup session, such as shown in FIG. 5 is used by the analytics engine to perform a comparative analysis of different backup methods to generate backup information, such as shown in FIG. 3B for presentation to the user. The metadata is also used to generate a comparative report so that the user may select an optimum backup strategy for present or future backup sessions based on the historic backup information. In an embodiment the analytics engine compiles past backup information for each client. Comparative data for a particular client may also be generated based on historical information for other clients, such as clients that routines perform backups of the same or similar type of data or that use the same target devices. Comparative data can also be generated as test data derived from controlled tests that measure backup times and throughputs for different backup scenarios. This comparative data provides the basis for determining the amount of time that a particular backup operation is likely to take and can be used to help answer the common customer question of how long it would take to backup a specific set of data, that is "what is the backup window for a particular application or dataset?" The comparative data is used to generate a report that provides the user with a proposed backup window for a particular backup operation, wherein the backup window defines a length of time to perform the backup.

In an embodiment, reporting engine 234 communicates with the analytic engine and generate the trends and reports based on certain filter criteria set by the user. Examples of filters include filtering information based on saved datasets or clients, sorting out the backups based on highest throughput first, and other similar filter functions. The reporting engine can thus be configured to give advanced filter/reporting option, such as, for example, generating a report based on the following characteristics:

a. Host A
b. Save Set A
c. Backup Level FULL
d. Sort By Throughput
e. Show Top 3 results.

FIG. 6 illustrates a table 600 that represents an example report generated by the backup server, under an embodiment. From the example report of FIG. 6, it is evident that the first row is the most optimized one and report engine will show the same to end user as the most optimum solution that will be faster and followed by second best option and third best option and so forth. The analytics engine helps the user to arrive at optimum solution and factor in these metrics into decision making process for backup operations.

For an embodiment in which the report is provided from the backup server to the client as a displayable and editable object through a GUI, network 110 typically represents the Internet, and the server computer 102 includes a World-Wide Web (WWW) server that stores data in the form of web pages and transmits these pages as Hypertext Markup Language (HTML) files over the network to client computers that run a web browser programs to access the web pages served by server computer 102 and any available content provider or supplemental server.

Figure 7:
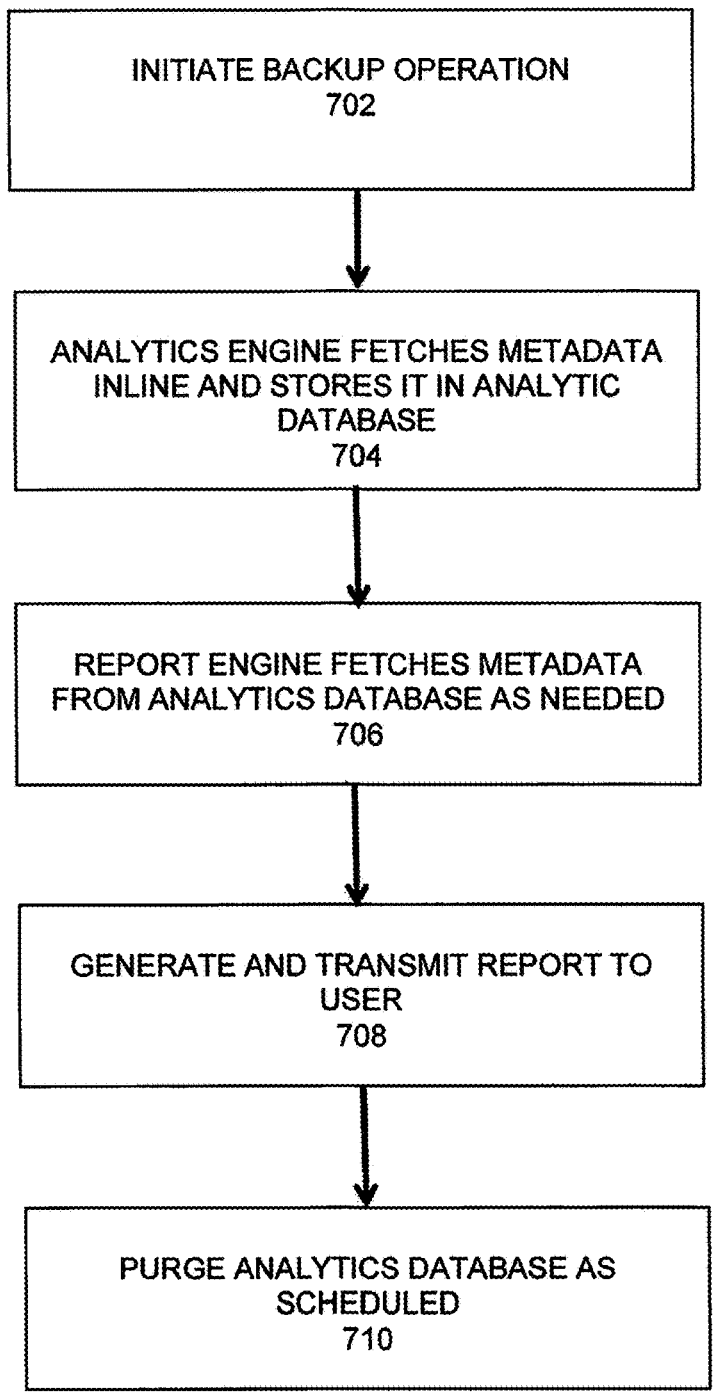
FIG. 7 is a flowchart that illustrates a method of performing backup operations using an analytics engine and report generator, under some embodiments.

FIG. 7 is a flowchart that illustrates a method of performing backups using an analytics engine and report generator, under an embodiment. The process of FIG. 7 begins when a backup process is started for a particular dataset on a client computer, block 702. This generally starts a backup session, such as a session listed in table 300 of FIG. 3A or table 310 of FIG. 3B. As the backup operation is performed, the analytics engine 230 captures the metadata 227 as it is received and processed by the backup server 220 for the data objects 229 and stores the metadata in the analytics database 232, block 704. The reporting engine 234 fetches the metadata from the analytics database as needed for purposes of report generation, block 706. Upon request for a report, it then generates and transmits the report to the user, block 708. After the report is processed, the analytics database 232 is purged in accordance with a pre-defined schedule or manual purge operation, block 710.

According to embodiments, the analytic backup system recommends which particular method of backup is best suited for a particular dataset by using history and/or test data based on storage device, data source, file types and sizes, and other parameters. The optimum method is presented in comparison with other methods with a prediction of backup window so that the optimum method features the highest throughput (data per unit time) or shortest backup window. In this way, a client user can make an informed decision with regard to possible backup methods as well as get a prediction of the backup window for a particular scenario.

Although embodiments have been described with respect to optimization based on time factors, such as backup window and/or throughput, it should be noted that other factors may also be considered instead or as well as the time aspect, such as optimization based on processor overhead (CPU cycles), number of active threads, power consumption, and so on. For these embodiments, the historic and test data would be expanded to measure and account for these factors, and a comparison of different backup methods with regard to these factors would be presented to the user for comparison.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of backing up data in a computer network having a backup server, comprising:
   automatically deriving, in an analytics component of the backup server, user configuration of a backup system in the computer network including a client computer coupled to the backup server and one or more data sources;
   performing, in a backup component of the backup server, deduplication backup operations on data of the one or more data sources;
   capturing metadata in the backup server of present and past backup operations in one of an online mode that captures metadata information as a backup session is performed, or an offline mode that parses a log viewer of a past backup operation for analysis at a later time, the metadata comprising information an attribute of a data source or a definition of data from the data source;
   storing the metadata of a respective backup operation in each of a catalog database of the backup server and an analytics database of the analytics component, wherein each database is accessible to the analytics component and the backup component;
   analyzing, in the analytics component, the metadata of past backup operations for the client computer based on data sources of respective datasets and a backup method performed on respective data sources;
   compiling a table from the catalog database correlating data source profiles for a plurality of data sources and a user profile for a user of the client computer to provide backup trend data, wherein the user profile comprises information of the user configuration including file types, target device types and file systems;
   providing a recommended backup procedure for a backup operation based on the backup trend data and the user configuration;
   determining a backup window for each past backup operation by tabulating a time required to backup each dataset of the past backup operations to a target storage device;
   comparing, in the analytics component, the backup window for each past backup operation with other backup windows for other past backup operations to determine an optimum backup method for a data source;
   predicting a predicted backup window for a present backup operation including the recommended backup procedure performed on the client computer for a data source of the respective data sources; and
   purging the metadata from the analytics database after the providing and predicting steps.

2. The method of claim 1 wherein the optimum backup method comprises one of the backup method with the shortest required backup time or a highest throughput value with respect to data backed up per unit of time, the method further comprising correlating data source profiles for a plurality of data sources and user profiles for a plurality of users to provide the trend data.

3. The method of claim 2 further comprising generating, in the second processing component, a report for transmission to the client computer displaying the tabulated time required to backup each dataset of the past backup operations, and the predicted backup window for the present backup operation.

4. The method of claim 1 wherein the trend data comprises a plurality of parameters comprising data type, backup level/data density, backup method, and target storage type.

5. The method of claim 1 wherein the data source comprises one of a high density file system, a medium density file system, and a low density file system.

6. The method of claim 1 wherein the target storage device comprises a type of storage device coupled to a backup server executing computer instructions implementing the method, and for storing the dataset of the present backup operation, and that is selected from at least one of a magnetic tape device, an optical disk array, a magnetic disk array, and a virtual memory storage.

7. The method of claim 6 wherein the metadata is associated with data objects of the respective dataset and comprises an attribute of the data source and definitions of the data including client name, data source name, backup time, backup level, backup method, data type, and backup target.

8. A system backing up data in a computer network having a backup server, comprising:
   an analytics component automatically deriving user configuration of a backup system in the computer network including a client computer coupled to the backup server and one or more data sources;
   a backup component of the backup server performing deduplication backup operations on data of the one or more data sources;
   a component compiling a table from the catalog database correlating data source profiles for a plurality of data sources and a user profile, including the user configuration, for a user of the client computer to provide backup trend data, wherein the user profile comprises file types, target device types and file systems, and providing a recommended backup procedure for a backup operation based on the backup trend data and the user configuration;
   the analytics engine further capturing metadata of present and past backup operations in one of an online mode that captures metadata information as a backup session is performed, or an offline mode that parses a log viewer of a past backup operation for analysis at a later time, the metadata comprising information an attribute of a data source or a definition of data from the data source, and deriving historical data about backup operations performed in a client-server computer network system, and analyzing a present backup operation to be performed for a client computer dataset with respect to a plurality of parameters comprising data type, backup level/data density, backup method, and target storage type; and
   a storage component storing the metadata of a respective backup operation in each of a catalog database of the backup server and an analytics database of the analytics component, wherein each database is accessible to the analytics component and the backup component;
   a reporting engine functionally coupled to the analytics engine and generating a report comparing the metadata of one or more past backup operations from the historical data to the present backup operation and the recommended backup procedure, and transmitting the report to a user of the client to facilitate selection of an optimum backup method for the present backup operation with respect to minimized backup operation time, wherein the metadata is purged from the analytics database after the generating of the report.

9. The system of claim 8 wherein the historical data comprises at least one of past backup operations performed by the client, past backup operations performed by other clients in the client-server computer network system, and test data derived from simulated backup operations performed by a backup server having the analytics engine.

10. The system of claim 8 wherein the backup level parameter comprises a full backup of all data in the dataset or an incremental backup of a portion of the dataset based on a previous backup operation.

11. The system of claim 10 wherein the data type comprises a type of data of the dataset based on an application that generates the dataset, and wherein the backup method comprises a backup process executed by the backup server for the client based on the application.

12. The system of claim 11 wherein the target storage type comprises a type of storage device coupled to the backup server for storing the dataset and is selected from at least one of a magnetic tape device, an optical disk array, a magnetic disk array, and a virtual memory storage.

13. The system of claim 8 wherein the reporting engine transmits the report to the client in the form of a displayable table listing a plurality of backup methods in order of increasing backup time.

14. The system of claim 13 wherein the report displays the backup times of the plurality of backup methods relative to one another to provide a ranked optimum backup method with the fastest backup method listed first in the table.

15. The system of claim 11 wherein the backup component initiates the optimum backup method for execution on the client dataset.

16. The system of claim 8 wherein the historical data regarding past backup operations is stored as the metadata, which is associated with data objects of a respective stored dataset.

17. The system of claim 16 wherein the metadata comprises an attribute of the data source and definitions of the data including client name, data source name, backup time, backup level, backup method, data type, and backup target.

18. The system of claim 8 further comprising the analytics component associating respective metadata with each historical backup operation.

19. A computer program product comprising a non-transitory computer usable medium having machine readable code embodied therein for backing up data in a computer network having a backup server, through a method comprising:

automatically deriving, in an analytics component of the backup server, user configuration of a backup system in the computer network including a client computer coupled to the backup server and one or more data sources;

performing, in a backup component of the backup server, deduplication backup operations on data of the one or more data sources;

capturing metadata in the backup server of present and past backup operations in one of an online mode that captures metadata information as a backup session is performed, or an offline mode that parses a log viewer of a past backup operation for analysis at a later time, the metadata comprising information an attribute of a data source or a definition of data from the data source;

storing the metadata of a respective backup operation in each of a catalog database of the backup server and an analytics database of the analytics component, wherein each database is accessible to the analytics component and the backup component;

analyzing, in the analytics component, the metadata of past backup operations for the client computer based on data sources of respective datasets and a backup method performed on respective data sources;

compiling a table from the catalog database correlating data source profiles for a plurality of data sources and a user profile for a user of the client computer to provide backup trend data, wherein the user profile comprises information of the user configuration including file types, target device types and file systems;

providing a recommended backup procedure for a backup operation based on the backup trend data and the user configuration;

determining a backup window for each past backup operation by tabulating a time required to backup each dataset of the past backup operations to a target storage device;

comparing, in the analytics component, the backup window for each past backup operation with other backup windows for other past backup operations to determine an optimum backup method for a data source;

predicting a predicted backup window for a present backup operation including the recommended backup procedure performed on the client computer for a data source of the respective data sources; and purging the metadata from the analytics database after the providing and predicting steps.

* * * * *